United States Patent [19]

Ephraim et al.

[11] Patent Number: 4,821,966
[45] Date of Patent: Apr. 18, 1989

[54] GRINDING MACHINE

[75] Inventors: Daniel R. Ephraim, Glencoe; Philip C. Ephraim, Evanston, both of Ill.

[73] Assignee: Grinders, Inc., Chicago, Ill.

[21] Appl. No.: 105,823

[22] Filed: Oct. 8, 1987

[51] Int. Cl.⁴ .............................................. B02C 7/14
[52] U.S. Cl. ...................................... 241/55; 241/247; 241/259.1; 241/261.2
[58] Field of Search .................. 241/259.1, 55, 259.2, 241/56, 259.3, 60, 261.2, 261.3, 296, 247

[56] References Cited

U.S. PATENT DOCUMENTS

| | | | |
|---|---|---|---|
| 2,004,704 | 6/1935 | Martin | 241/55 |
| 2,068,071 | 1/1937 | Quehl | 241/55 |
| 3,488,008 | 1/1970 | Bodine | 241/55 X |
| 3,638,871 | 2/1972 | Barger | 241/55 X |

Primary Examiner—Mark Rosenbaum
Attorney, Agent, or Firm—Dressler, Goldsmith, Shore, Sutker & Milnamow, Ltd.

[57] ABSTRACT

A grinding machine comprised of adjustable grinding mechanism for grinding material into preselected sized grounds. The grinding mechanism includes a stationary grinding burr and a grinding burr affixed to an axially adjustable rotor assembly. The rotor assembly includes on its face opposite to where the grinding burr is located a vane assembly which is designed to insure that any of the ground material that seeks to move into the cavity in which the vaned portion of the rotor and other adjustable mechanisms are located is evicted from said cavity to prevent fouling of the adjustable mechanisms located therein.

1 Claim, 2 Drawing Sheets

GRINDING MACHINE

This invention relates to a grinding machine and, particularly, to one which is used for coffee beans, or the like, and which is designed to prevent fouling of the mechanism by insuring that all of the ground material is ejected from the grinder and thus not permitted to clog up any of the bearings or other adjustable components.

Currently available grinding machines function very effectively to grind the material to be ground by introducing the material, such as, coffee beans, into an area between two relatively rotating grinding wheels that have burrs on their cooperating surfaces to perform the grinding function. The ground material then flows through a discharge outlet, such as, a hopper, where it is then bagged or directly used for making coffee.

Existing machines, while capable of performing the aforementioned function, are subject to the deficiency in that there exists the possibility that the ground material will seep into bearing areas or a chamber including adjustable components, which could bring about fouling of the mechanisms, thus requiring the grinder to be stopped, disassembled, and cleaned.

A particular example of the problem with which the present invention deals is commercial coffee grinders that are used in grocery stores, supermarkets, and specialty stores, and are frequently available for use by customers and staff and frequently are adjustable to vary the coarseness of the grind. When these grinders permit adjustment for very fine grounds, such as, for expresso, the coffee consistency is such that the grind is almost powderlike. Fine, lightweight ground coffee sometimes tends to be dispersed by the rotating grinding burr into zones of the grinder in which it collects and eventually causes fouling of the mechanism and adversely affects the operation of the machine.

In coffee grinding machines which have a pair of grinding burrs, and which is carried by a rotor, it has been found that expresso ground coffee tends to carry forward of the rotor, and then up between the front of the rotor and the confronting housing, where it collects, eventually requiring the machine to be serviced, both for operation and sanitation requirement purposes.

It would be of advantage to provide a rotating burr coffee grinding machine, which prevented the undesired movement of collection of fine ground coffee particles forwardly of the rotor and to assure that virtually all of the ground coffee exited through the discharge part is provided.

In the prior art device, the front face of the rotor, in the zone confronting the housing zone in which fine coffee tended to collect, was generally flat. Of course, it was spaced away from the housing because of the need to allow adjustment of the rotor and associated burr toward and away from the confronting stationary burr.

In accordance with the present invention, there is provided a grinding machine that is designed to insure that any ground material tending to move into areas including bearings, or the like, which would tend to foul the mechanism is prevented from doing so by designing the grinding assembly to direct all ground material away from such areas and out through a discharge outlet. Thus, not only the ground material that normally flows into the discharge outlet would do so, but any such ground material that in previous designs would tend to move into the areas adjacent the outlet containing bearings and other mechanisms that could be rendered ineffective by finely ground material would be directed out through the discharge outlet. In the embodiment illustrated, this is accomplished by providing suitably disposed vanes which closely confront the housing at their forward and outer edges and which are designed to direct any material tending to move into the area of the vanes in an outward direction under the action of an outwardly directed airflow toward the discharge outlet. Other advantages will be apparent from a description of the following drawings, wherein:

Figure 1:
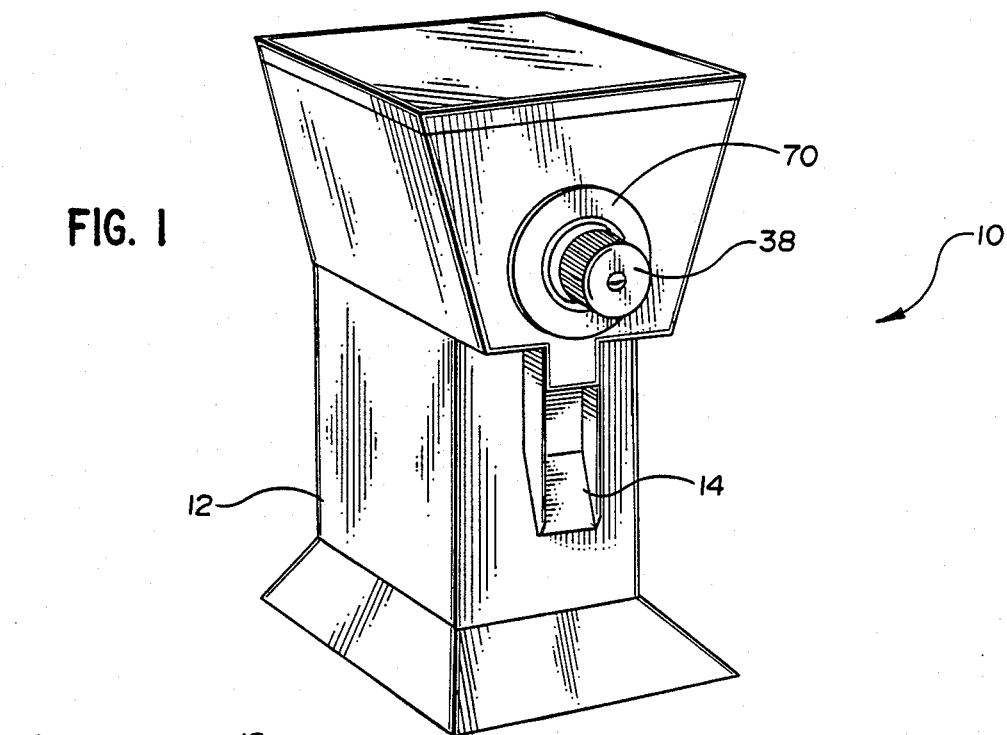
FIG. 1 is a perspective view of a coffee grinder incorporating the present invention.

Referring now to the drawings, there is illustrated in FIG. 1 a grinder 10 mounted on a pedestal 12. The ground material, in this case coffee, is fed through a discharge hopper 14 into a suitable receptacle, such as, a bag (not shown).

Figure 2:
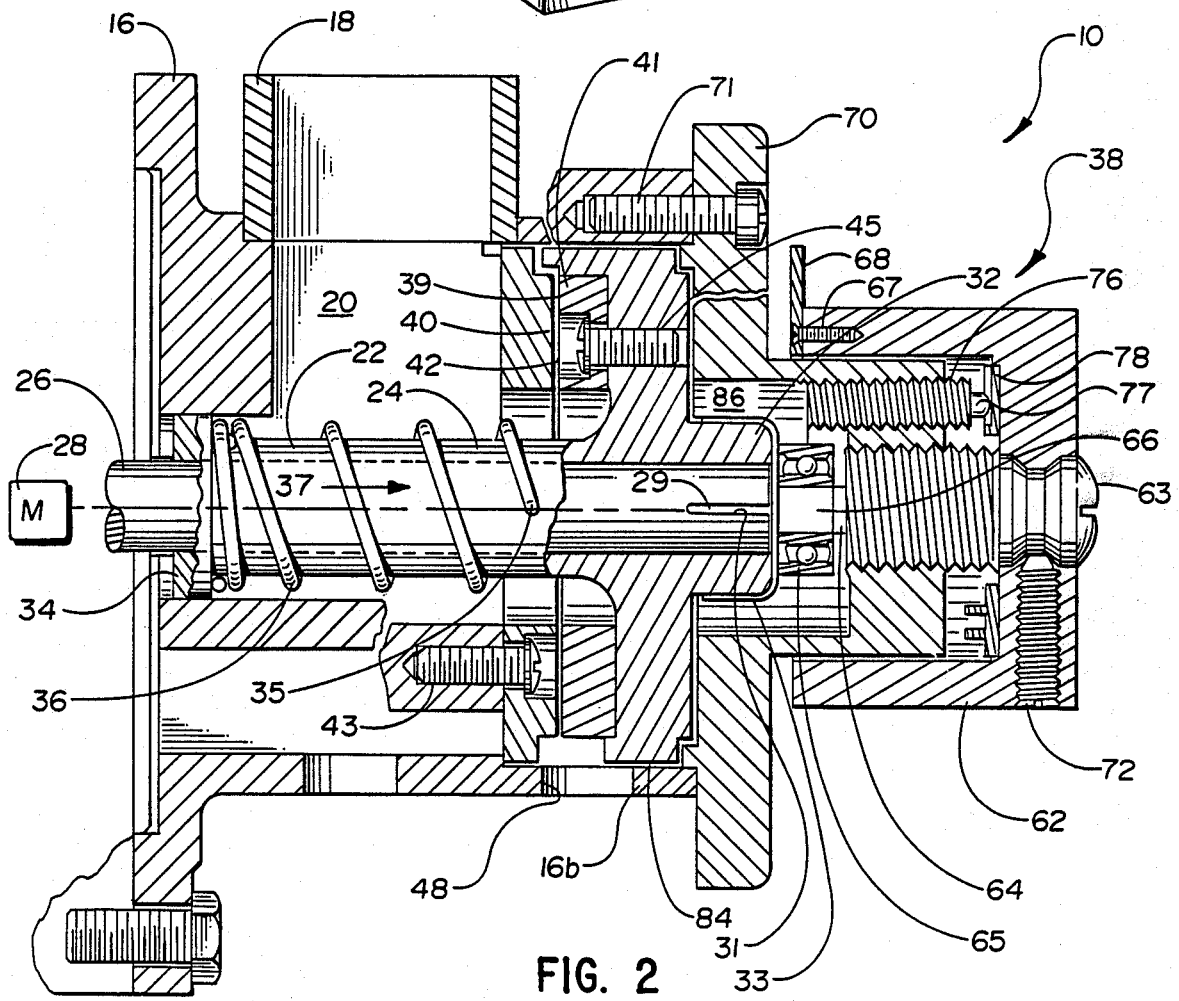
FIG. 2 is a cross-sectional view of the grinding mechanism.

Now referring to FIG. 2, there are shown in cross section the essential components of the grinding mechanism incorporating applicant's invention. It is to be noted that the description immediately following is that of a grinding machine that is currently available on the market and the improvement will be specifically designated, which in combination with the commercially available components constitutes applicant's invention.

The grinding mechanism consists of a grinder housing 16 that includes at its upper end thereof a hopper sleeve 18, into which the coffee beans are disposed for grinding. The beans move into the chamber 20 through which a rotor assembly 22 including a rotor 24 transversely extends. The rotor 24 is disposed about and secured to a motor shaft 26 that is driven by a motor 28. The interconnection between the rotor and the shaft consists of a shear plate 29 that extends through cooperating slots 30,31 in the rotor hub 32 and shaft 26 at the right-hand end of the motor shaft 26. The shear plate 29 is retained in position relative to the shaft and rotor by the rotor cap 33 that is press-fitted over the end of the rotor hub 32. The chamber 20 is sealed relative to the motor shaft 26 by a bushing seal 34 that is press-fitted onto the shaft 26.

Located about the rotor 24 in the chamber 20 is a compression spring 36 which is connected to the rotor at 35 and its other end engages bushing 34 to constantly bias the rotor in a right-hand direction as indicated by the arrow 37. Thus, the rotor is constantly biased to the right against the grind adjusting assembly 38 which will be described in detail hereinafter.

Figure 4:
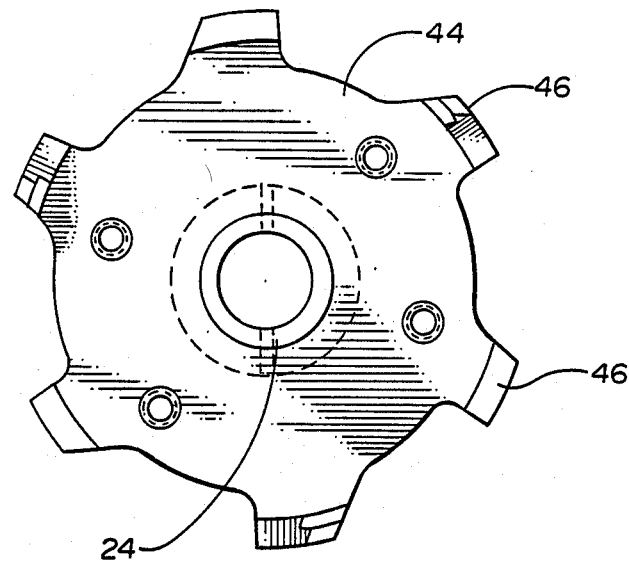
FIG. 4 is a rear view of the rotor with the front grinding burr plate removed.
Figure 3:
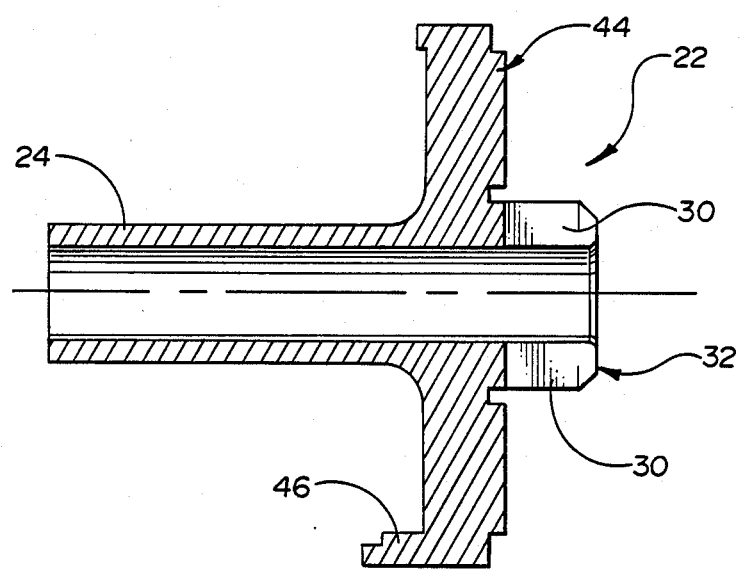
FIG. 3 is a cross-sectional view of the rotor forming an integral part of the mechanism.

The spring 36 also serves as an auger to move the beans in the chamber 20 to the right into a grinding area or zone 39 located between two burr plates 40,41 which interact to grind the beans into the particle size determined by the grind adjusting assembly 38. The spacing between the burr plates, or clearance gap 42, determines the fineness of the grind of the coffee bean. The rear grinding burr plate 40 is fixedly secured by screws 43 to the housing 16. The front grinding burr plate 41 is secured to the radially extending flange 44 of the rotor assembly 22 by screws 45. Referring to FIGS. 3 and 4, there is illustrated the rear view of the rotor assembly 22 with the front grinding burr plate 41 removed. The outer periphery of the rotor flange 44 includes circumferentially spaced rearwardly extending flanges 46 that serve as guides for front grinding burr plate 41.

As previously mentioned, the rotor assembly 22 is continuously biased to the right, as shown in the drawings, and thus the clearance gap 42 which determines the coffee grind is regulated by the distance the front grinding burr plate 41 is permitted to move from the rear grinding burr plate 40. At the bottom of the housing 16 is a discharge outlet 48 through which the ground material flows into the discharge hopper for collection.

The clearance gap 42 is set by the adjusting assembly 38, which acts to limit the movement of the rotor assembly 22 and thus the position of the front grinding burr plate which is normally biased against the adjusting assembly 38 by the spring 36 acting on the rotor 24. Specifically, the position of the front grinding burr plate 41 is adjusted relative to the drive shaft 26 to set the gap 42 between the front and rear grinding burr plates, which determines the grind of the coffee.

The adjusting assembly 38 consists of an adjusting knob 62, through which is disposed an adjusting screw 63 that includes a first portion 64 that engages bearing 65 and a rod portion 66 located within the bearing 65. The screw portion 64 engages the thrust bearing and presses it into engagement with the rotor cap 33 to fix the position of the rotor to set the gap 42. Since, as previously mentioned, the rotor assembly 22 is normally biased to the right by the spring 36, the gap between the front and rear burr plates is determined by the position of the adjusting screw 64. The adjusting screw knob has disposed thereon by screws 67, a pointer 68, which when moved by the adjusting knob indicates a reading on the dial plate 70 that is calibrated to indicate the grind of coffee obtained in response to a given setting. Dial plate 70 is affixed to housing 16 by screws 71. The retention of the knob 62 relative to the adjusting screw 63 is fixed by the knob screw 72. It remains to note that there is disposed a detent mechanism 76, which consists of a spring-biased knob 77 that is forced against the detent plate 78, which is indexed to retain the adjusting knob in various incremental positions when it is rotated. There is also provided a stop mechanism (not shown) which limits the rotational movement of the adjusting knob 62 so that its movement will be clearly defined.

As previously mentioned, the aforementioned components of the grinding mechanism is considered to be prior art. However, this construction is subject to the potential problem that during the grinding process there is a tendency for ground material to flow through the clearance gap 84 and into a chamber 86, which ground material would act to foul up the bearings and the adjusting screw, requiring that the machine be shut down and dismantled in order to clean the various mechanisms so that the grinding mechanism will operate in a proper manner.

Figure 5:
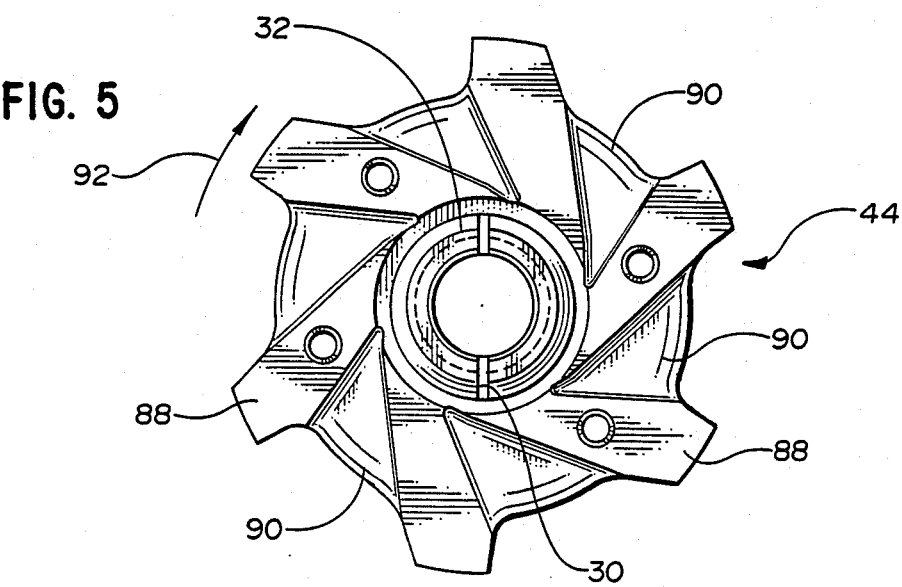
FIG. 5 is a front view of the rotor.

Thus, it can be appreciated that the grinding mechanism must be designed so that material is kept out of the chamber 86 to prevent fouling up of the adjusting mechanism. To prevent this from occurring, the present invention includes the provision of a plurality of spirally extending vanes 88 on the front side of the rotor flange 44. These vanes can best be seen by referring to FIG. 5.

Located between the vanes 88 are deep cavities 90 through which airflow is directedly outwardly by the vane construction, thereby preventing fine ground material from collecting between the rotor assembly and the housing. The vanes 88 and generally coextensive flanges 46 extend outwardly beyond the periphery of the front grinding burr 41. The front surfaces of the vanes are located as close as practicable to the housing sidewall 16a to minimize the flow of fine ground material therebetween into the chamber 86. The gap 89 must be sufficient to permit axial movement of the rotor assembly to facilitate adjustment thereof for various grinding settings. The flanges 46 overhanging the front burr plate are extensions of the vanes 88 and are located closely adjacent the outer housing sidewall 16b to minimize gap 84. Thus, when the grinding machine is operating any movement of ground material through the gap 84 into the chamber 86 will be prevented by the action of the vanes 88 which will act to direct any material moving through the gap and into the spaces between the vanes outwardly by the outward airflow directed through the cavities 90 as the rotor moves in a clockwise direction, as indicated by arrow 92. Such material will move through the gap 84 and out through the discharge outlet 48.

It is, of course, intended to cover by the appended claims all such modifications as fall within the true spirit and scope of the invention.

What is claimed is:

1. A grinder comprising a housing having an inlet and an outlet, a first grinding burr fixedly mounted on said housing and defining a first grinding face, an axially adjustable rotor assembly having two main faces and including a second grinding burr disposed on one face of the rotor assembly and defining a second grinding face facing said first grinding face, means for moving the position of said rotor assembly to adjust the spacing between said first and second grinding faces to adjust the coarseness of the grind to be produced by the grinding burrs, including a spring means having one end secured to said rotor assembly and its other end contacting said housing for bearing said rotor assembly away from said first grinding face and further includes an adjusting mechanism for determining the movement of said rotor assembly in response to said spring means to adjust the coarseness of the grind to be produced by the grinding burrs, the other face of the rotor assembly facing a housing cavity containing bearings and adjustable mechanisms and defining a plurality of generally spirally disposed vanes, each projecting in a generally outward direction outwardly of the second grinding burr secured to said rotor assembly and terminating in a peripheral edge closely confronting a surface defining the housing cavity, the forward faces of the vanes closely confronting a surface of the housing defining the cavity, and deep cavities in the rotor face between the vanes, the bases of which are distant from the surface of the housing defining the cavity, whereby the vaned rotor prevents the collection of finely ground material in the housing cavity to prevent fouling of the bearings and adjustable mechanisms disposed therein and promotes discharge of the ground material through the housing outlet.

* * * * *